Oct. 9, 1962

W. D. BRADEN 3,057,566

TIRE BEAD BUILDING MACHINE

Filed April 3, 1959

INVENTOR.
WILLIAM D. BRADEN
BY
J. B. Holden
ATTORNEY

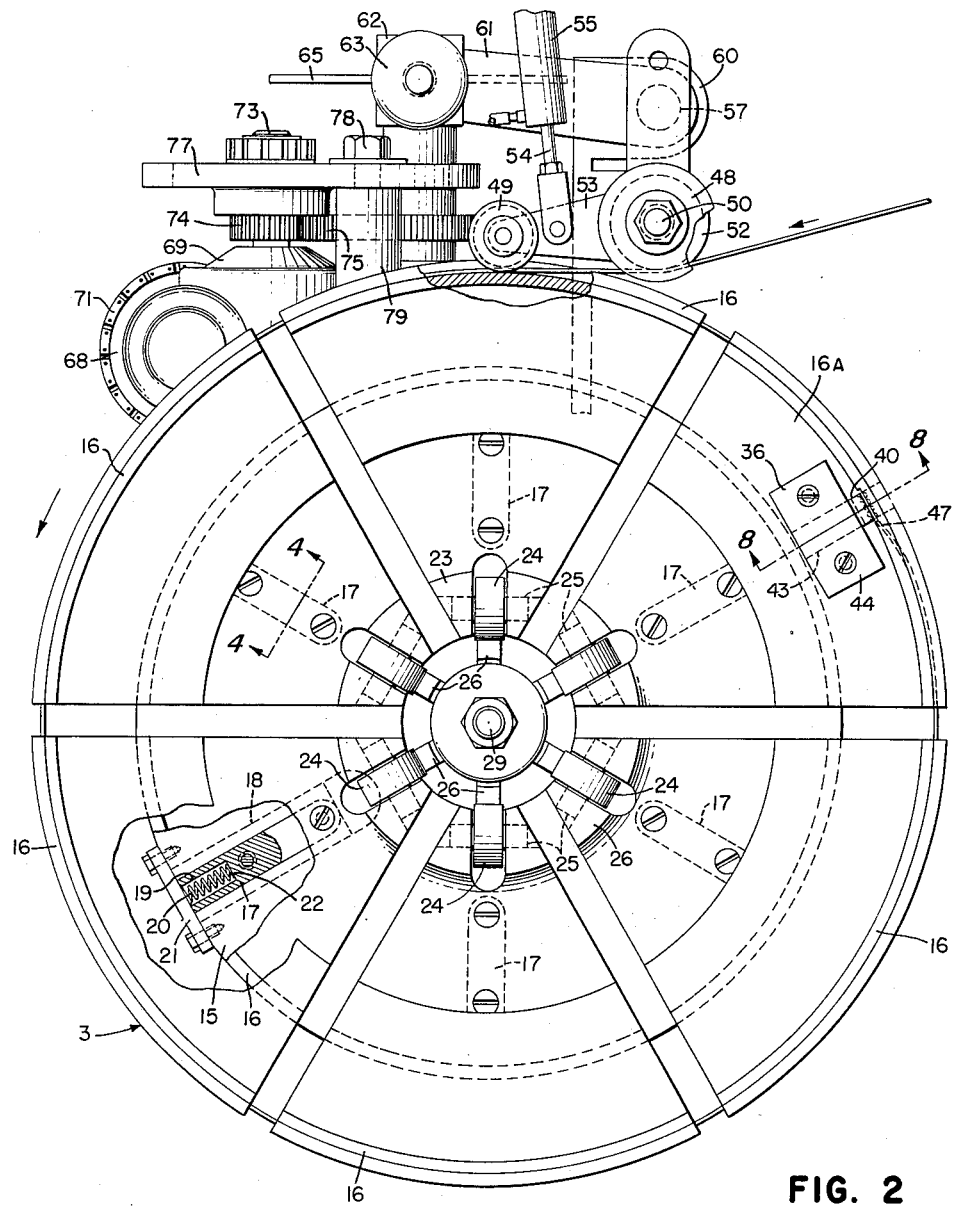
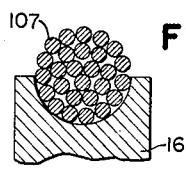
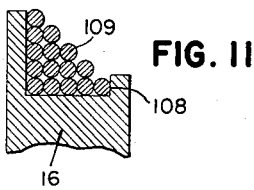
FIG. 2
FIG. 10    FIG. 11
*INVENTOR.*
WILLIAM D. BRADEN
BY
J. B. Holden
ATTORNEY

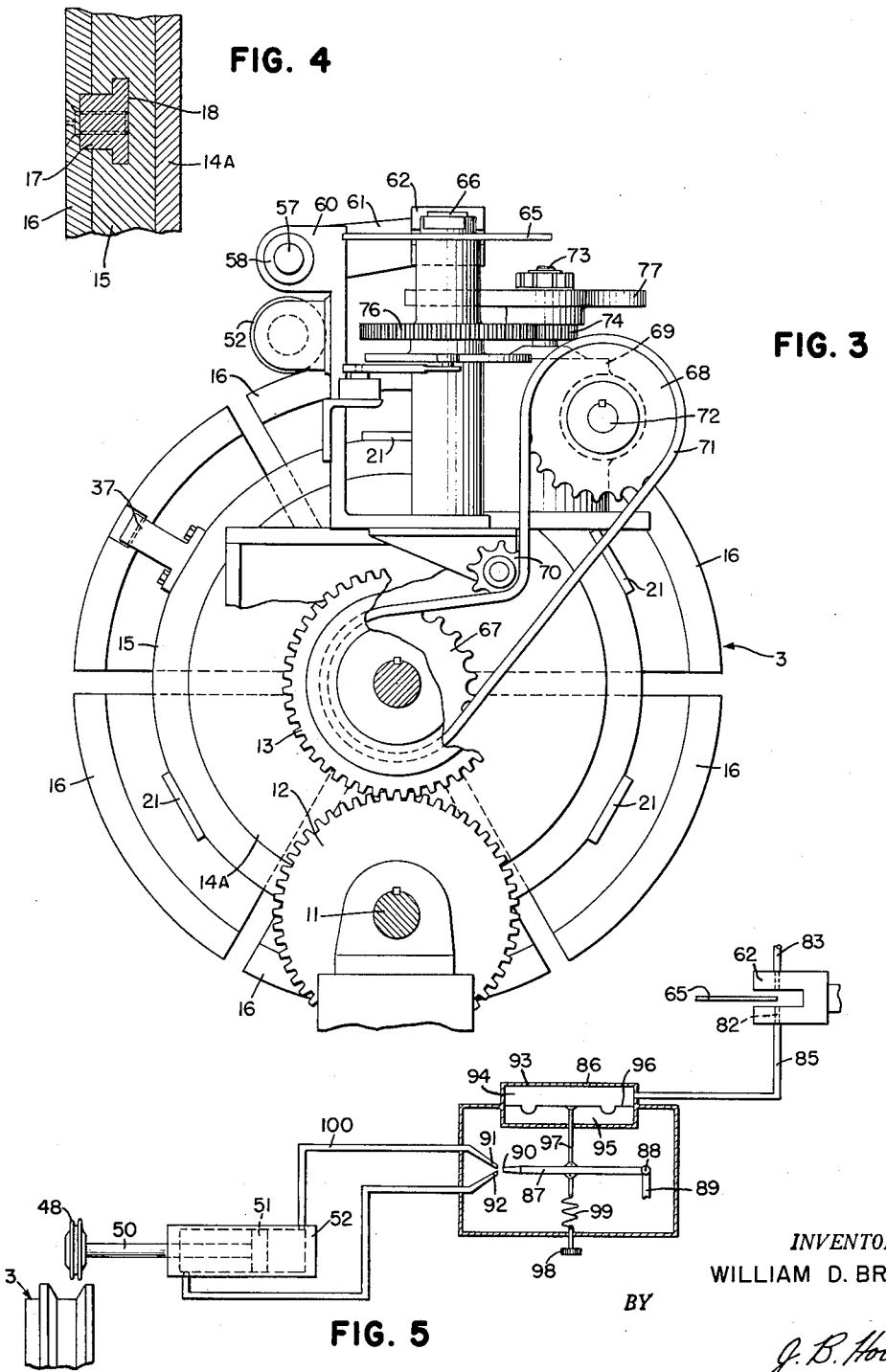

Oct. 9, 1962 W. D. BRADEN 3,057,566
TIRE BEAD BUILDING MACHINE
Filed April 3, 1959 4 Sheets-Sheet 4

INVENTOR.
WILLIAM D. BRADEN
BY
J. B. Holden
ATTORNEY

United States Patent Office 3,057,566
Patented Oct. 9, 1962

3,057,566
TIRE BEAD BUILDING MACHINE
William D. Braden, Stow, Ohio, assignor to The Goodyear Tire & Rubber Company, Akron, Ohio, a corporation of Ohio
Filed Apr. 3, 1959, Ser. No. 803,885
2 Claims. (Cl. 242—7)

This invention relates to an apparatus for making beads and in particular to apparatus for forming bead rings used in pneumatic tires.

Generally, the apparatus consists of means for feeding a rubber insulated strand of wire onto a reel or drum, clamping the end of the wire to the drum, winding the wire in a plurality of convolutions, cutting the opposite end of the wire, and ejecting the completed bead ring from the apparatus.

Among the objects and advantages of this invention is to provide a machine which is completely automatic with the resultant characteristics of speed and production, economy in operation, and uniformity of the finished bead rings.

Another object of the invention is to provide a bead-forming machine in which each convolution of the wire is laid in a positive location to form bead rings of uniform and pre-determined cross sections.

Another object of the invention is to provide a bead forming apparatus in which the bead rings are wound on a drum and guided into a positive position by means of a guide which is movable axially of the drum and positively positioned at pre-determined locations axially of the drum during each rotation thereof.

Other objects and advantages will become apparent in the following detailed description when considered in connection with the accompanying drawings, in which:

FIG. 2 is a partial front elevational view of the apparatus with parts broken away;

FIG. 3 is a rear elevational view of the apparatus with parts broken away;

FIG. 4 is a sectional view taken along the lines 4—4 of FIG. 2;

FIG. 5 is a diagrammatic view of the control for the guide mechanism;

FIG. 7 is a cross sectional view taken along the lines 7—7 of FIG. 6;

FIGS. 10 and 11 are cross sectional views of bead rings which may be made on the apparatus of this invention;

Figure 12:
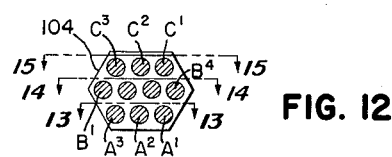
FIG. 12 is a cross sectional view of a hexagonal shape bead made by the apparatus of this invention.
Figure 13:
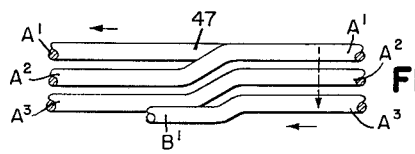
Figure 14:
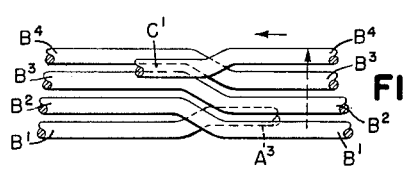
Figure 15:
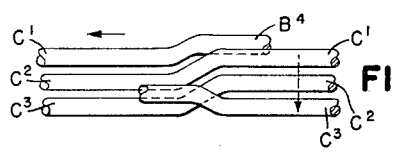

FIGS. 13, 14 and 15 are cross sectional views taken along the lines 13—13, 14—14, and 15—15 respectively of FIG. 12.

Figure 1:
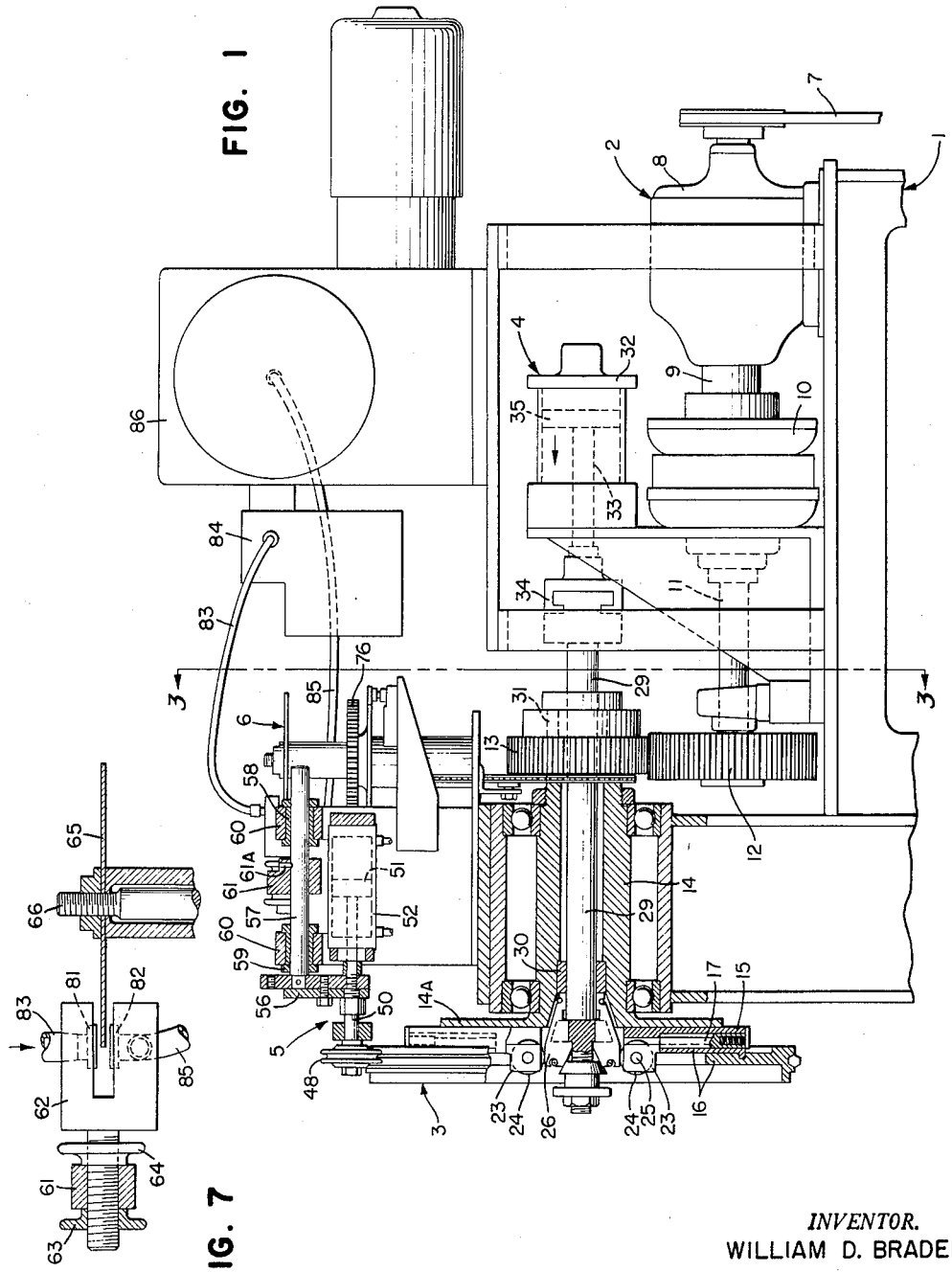
FIG. 1 is a side elevational view of the apparatus with parts broken away.

Referring to FIG. 1, there is shown a side view of the apparatus which comprises a frame 1 which supports a driving mechanism 2, a winding reel or drum 3, a mechanism 4 for radially expanding the winding reel or drum, a mechanism 5 for guiding the wire axially of the winding reel or drum and the control mechanism 6 for positively positioning the guiding mechanism.

Driving Mechanism

The driving mechanism 2 is particularly illustrated in FIG. 1 and comprises a motor (not shown) connected by a belt 7 driving a reduction gear box 8. The output shaft 9 of the reduction gear box 8 drives a combination brake and clutch mechanism 10 which is connected by a shaft 11 to a gear 12. The gear 12 is in train with a gear 13 secured to a hollow shaft 14 which is integrally attached to a back disc 15 of the winding reel or drum 3.

Winding Reel or Drum

Referring to FIGS. 1, 2 and 3, the winding reel or drum 3 comprises a back disc 15 which is secured to the flange 14a of shaft 14 and upon which are radially slidably mounted a plurality of segments 16. The back disc 15 is provided with a plurality of slide members 17, as shown in FIG. 4, which are T-shaped in cross section and extend radially of the disc 15 within T-slots 18. As further shown in FIG. 2 each slide member 17 is provided with a bore 19 having a compression spring 20 therein. The spring 20 is compressed between a plate 21 secured to the back disc 15 and the bottom 22 of the bore 19 so as to compress the spring 20 when the segments 16 are in radially expanded position whereby the segments 16 are spring biased in a radially inward direction.

Drum Expanding Mechanism

As shown in FIG. 2 each of the segments 16 are provided at their inner end 23 with a roller 24 rotatably mounted on a pin 25. Each of the rollers 24 of the respective segments 16 engages a cone section 26 of the axially slidable shaft 29. The shaft 29 passes internally of the axle 14, rotates with the axle 14 but is axially movable relative thereto within the bearings 30 and 31. The slidable shaft 29 is axially moved by means of a cylinder 32 having a piston rod 33 connected to the shaft 29 through a thrust bearing 34. It is obvious that as the piston 35 is moved to the left from the position shown in FIG. 1, the shaft 29 is likewise moved to the left so that the cone sections 26 move relative to the rollers 24 of the segment 16 permitting the segments to move radially inwardly under the action of the spring 20. As the piston 35 is moved in the opposite direction the rollers 24 ride on the cone segments 26 into a radially outward position to move the segment 16 aganist the bias of the spring 20 into a radially expanded position as shown in FIG. 2.

Figure 8:
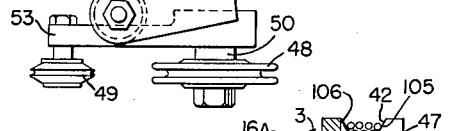
FIG. 8 is a partial cross sectional view showing the drum and wire clamping mechanism in normal operating position.
Figure 9:
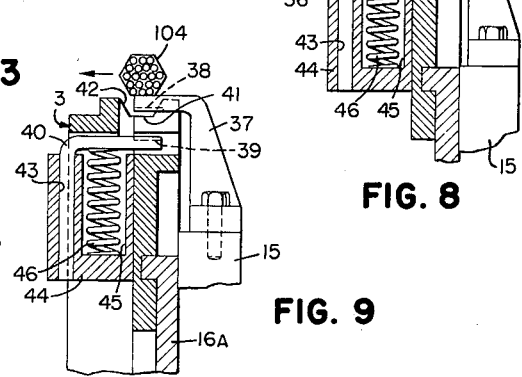
FIG. 9 is a cross sectional view similar to FIG. 8 showing the drum and wire clamping mechanism in retracted position.

As shown in FIG. 2, the segment 16a is provided with a wire clamping mechanism 36 for clamping the initial end 47 of the wire strand to the periphery of the drum prior to winding. As shown in FIGS. 8 and 9 the back disc 15 of the drum is provided with a clamp shoe 37 which extends into a slot formed in the outer periphery of the drum segment 16a. The lower surface 38 of the shoe 37 is serrated and likewise the upper surface 39 of the lower brake shoe 40 is serrated. When the drum 3 is in retracted position as shown in FIG. 9, the serrated surface 38 of the shoe 37 is positioned radially outward of the base 41 of the groove 42 formed in the radially outer periphery of each of the segments 16. The lower clamping shoe 40 is slidably mounted within a slot 43 formed in the member 44 which is secured to the segment 16a. The member 44 is provided with a bore 45 having a spring 46 positioned therein to bias the clamp shoe 40 in a radially outer direction. With the ring segment 16a in collapsed position as shown in FIG. 9, the end of a wire strand 47 is inserted between the base 41 of the groove 42 and the serrated base 38 of the shoe 37. The ring segments 16 are then moved radially into their normal expanded position, thereby gripping the wire end between the serrated portions 38 and 39 of the shoes 37 and 40 as shown in FIG. 8. As shown in FIG. 2, the base 41 of the slot 42 in segment 16a is slotted circumferentially for a limited distance so that the wire end 47 is guided radially outward into a normal position in the slot 42 as shown in FIG. 8.

Wire Guiding Mechanism

The end 47 of the wire strand is fed from a suitable festoon (not shown) into engagement with a grooved roller guide 48 and a pressure roller guide 49. The roller guide 48 is rotatably mounted upon a shaft 50 which is connected to a piston 51 of the cylinder 52 which when actuated moves the roller 48 axially of the drum 3. The roller 49 is mounted for rotation upon a stub axle secured to an arm 53 which is pivotably mounted upon the shaft 50. The arm 53 is pivotally moved about the shaft 50 by means of a rod 54 actuated by cylinder 55.

Wire Guide Control Mechanism

The shaft 50 as shown in FIG. 1 is provided with a lug 56 having an auxiliary shaft 57 extending parallel to the shaft 50 and mounted within bearings 58 and 59 supported by lugs 60 from the frame of the machine. A support member 61 is keyed as at 61A to the shaft 57 to prevent axial movement relative thereto. The member 61 extends at right angles to the shaft 57 and as shown in FIG. 7 supports a sensing member 62 having suitable threaded nuts 63 and 64 for adjustably positioning the sensor 62 relative to a template 65 secured to shaft 66. It is thus seen that, as the cylinder 52 moves the guide roller 49 and 48 axially of the drum 3, the sensor 62 is moved radially of the template 65 for purposes to be explained more in detail hereinafter.

Figure 6:
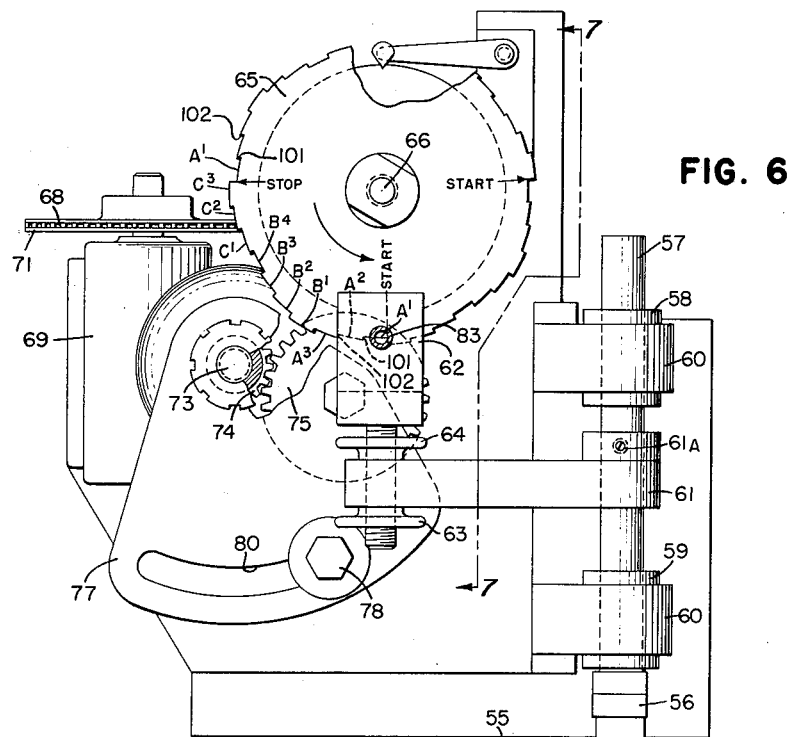
FIG. 6 is a plan view of the apparatus.

Referring now to FIGS. 3 and 6 of the drawings, the shaft 66 is driven from the main shaft 14 through a suitable chain-driven gear train consisting of a gear 67 mounted on the main shaft, a gear 68 comprising the input of a reduction gear box 69 and an idler gear 70, all of which are connected by a driving chain 71. The input gear 68 of the gear box 69 drives the input shaft 72 thereof so that the output shaft 73 rotates at a substantially reduced speed. A small pinion gear 74 is secured to the shaft 73 and drives gear 75 which in turn drives gear 76 connected to the shaft 66. The gear 75 is mounted upon a plate 77 which is rotatably adjusted about the shaft 73 by means of a bolt 78 secured to a fixed stand 79 and passing through an arcuate slot 80 within the member 77. By merely changing the size of the gear 76 and adjusting the position thereof between the gears 74 and 76 the r.p.m. of the shaft 66 can be adjusted so that templates 65 of various designs can be quickly and easily substituted for the template 65 shown in FIG. 6.

As previously indicated the guide rollers 48 and 49 are moved axially of the drum 3 by the cylinder 52. The axial position of the guide rollers 48 and 49 and in turn the position of the piston 51 within the cylinder 52 is controlled by the template 65 having a peripheral edge which varies in radial dimension and passes between an inlet nozzle 81 and outlet nozzle 82 of the sensor 62. A fluid medium, preferably air, is supplied to the inlet nozzle 81 by means of a tube 83 connected to an air compressor 84. The sensor 62 is U-shaped in cross section and a continuous stream of air passes from the inlet nozzle 81 to the outlet nozzle 82 with the edge of the template 65 interrupting the stream. As the template 65 rotates through the stream the amount of air passing into the outlet nozzle 82 is varied. The outlet nozzle 82 is connected by a flexible tube 85 to a fluid pressure relay or regulator 86, as shown in FIG. 5, which converts the variations in air pressure passing through the tube 84 into variations in hydraulic fluid pressure within the cylinder 52. As shown in FIG. 5, the regulator 86, of the well-known "Askania" jet pipe type, includes a movable jet pipe 87 pivoted at 88 and supplied with pressure fluid, preferably oil, from a suitable source (not shown) to the inlet 89. The fluid pressure which is ejected from the orifice 90 of the jet pipe 87 is directed into the reception orifices 91 or 92 depending upon the relative position of the jet pipe 87. The jet pipe 87 is controlled by a differential pressure device comprising a casing 93 separated into two chambers 94 and 95 by a diaphragm 96 which is connected to the jet pipe nozzle by a link 97. The jet pipe 87 may be adjusted to a neutral position relative to the orifices 91 and 92 by means of an adjusting screw 98 connected to the jet pipe 87 by a spring 99.

The template 65 shown in FIG. 6 of the drawings is designed to control the guide rollers for making a bead ring of hexagon shape in cross section as shown in FIG. 12 of the drawings and comprising 10 convolutions or turns of the wire strand. The template 65 is driven as previously described so that for every ten revolutions of the main drum 3 the template 65 will rotate 90 degrees. With the initial end 47 of the wire strand clamped to the base of the groove 42, as previously described, the drum 3 is rotated and likewise the template 65. Assuming that the proper effective relationship of the template 65 and the nozzle 81 and 82 is such that the template projects a distance into the air jet between the nozzles of approximately one-half the cross sectional area thereof, as shown in FIG. 6, the edge of the template 65 moves until a radially larger segment of the template covers more than one-half the cross sectional area of the air jet. The air pressure in tube 85 will then be lowered so that the pressure in the chamber 94 will also be lowered to slightly rotate the jet pipe 87 in a clockwise direction. This movement increases the pressure in the pipe 100 connected to the orifice 91 so that the piston 51 is moved axially of the drum 3 in a direction shown by the arrow in FIG. 13. The regulator 86, therefore, acts as a pressure relay which converts the variations in air pressure received by the nozzle 82 into variations in hydraulic fluid pressure within the cylinder 52. Also, since the sensor 62 is secured to shaft 57 which reciprocates in a direction radially of the template 65 and is in turn moved by the piston rod 50, a position feed back is provided so that the nozzles 81 and 82 are maintained at the proper position relative to the periphery of the template 65. In other words, if the periphery of the template 65 increases in radial dimension from a first position of lesser to second position of a greater radius and the second position is to be maintained, the sensor 62 is moved radially outward relative to the shaft 66 so that the edge of the template is positioned to cover approximately one half the cross sectional area of the nozzles at the second position.

Starting with the template 65 in the position shown in FIG. 6 and with the initial end 47 of the wire being clamped to the drum as shown in FIG. 8 the guide roller 49 is maintained in an axial position relative to the groove 42 as shown in FIG. 13 and is maintained in that position for approximately one revolution to lay the convolution or loop $A_1$. The template 65 will then be rotated in the direction shown in FIG. 6 until the shoulder 101 interrupts the air stream between the nozzles 81 and 82 so that the guide roller 49 moves axially of the groove 42 to lay the convolution $A_2$ axially adjacent the convolution $A_1$. The movement of the guide roll 49 takes place within a relatively short period of time and in an interval of time preferably less than a minor portion of the time interval of one revolution of the drum 3. The drum 3 then makes another revolution to lay the convolution $A_2$ and immediately before completing a one revolution the cam 65 has rotated until the shoulder 102 interrupts the air stream between the nozzles 81 and 82 of the sensor 62 to move the guide roll 49 axially adjacent the convolution $A_2$ to lay the convolution $A_3$. The guide roller 49 is repeatedly actuated in the above manner until the first layer A of the convolutions, the second layer B of the convolutions and the third layer C of the convolutions are laid in their predetermined locations, at which time cam 103 actuates a limit switch (not shown) which de-energizes the motor and actuates the brake 10. Thereafter the cylinder 32 is actuated to move the cone segments 26 to the left as seen in FIG. 1 to retract the segments 16 so that the completed bead ring 104 may be removed from the drum.

Referring to FIGS. 12 through 15, it should be noted that the crossovers from one convolution to the next are substantially symmetrical in each layer but in opposite direction between adjacent layers. When laying the convolution B₁, the guide roller 49 is moved outboard of the convolution A₃ a distance of about one half of the diameter of the wire strand 47, so that the convolution B₁ overlies the convolution A₃. After convolutions, B₂, B₃, and B₄ are laid the convolution C₁, is laid inboard of the convolution B₄ and the convolution C₃ is laid last. Thus, it is seen that each convolution is laid in a positive predetermined location to form a bead of uniformly spaced convolutions and of predetermined cross section.

As previously indicated, the wire strand is coated with a thin layer of unvulcanized rubber insulation and laid by guide 49 under pressure. Therefore, the respective convolutions of the completed bead ring readily adhere to each other and retain their respective positions. Furthermore, the rubber insulation flows to fill the voids between the wires as shown in FIG. 12.

This invention has been shown and described with respect to a drum having a groove 42 with inclined sides 105 and 106 and a flat base 41 in order that a hexagonal cross sectional shaped bead 104 may be made. However, it is apparent that by merely changing the shape of the groove 42 into an arcuate shape as shown in FIG. 10 and the distribution and radial extent of the shoulders of the cam 65 a bead 107 of circular cross section may be automatically formed. Likewise, by shaping the ends of the segments 16 into a groove 108 of rectilinear cross section a bead 109 of triangular cross section can be formed.

While certain representative embodiments and details have been shown for the purpose of illustrating the invention, it will be apparent to those skilled in this art that various changes and modifications may be made herein without departing from the spirit or scope of the invention.

I claim:

1. A machine for constructing tire beads made of a single continuous length of wire comprising a rotatable drum, means for rotating the drum, means for securing the initial end of the wire to the periphery of the drum, means for guiding the wire on the drum as the drum is rotated, a double acting cylinder for moving the guiding means axially of the drum actuated by fluid pressure, control means for changing the fluid pressure to said cylinder for moving the guide means axially of the drum a predetermined distance once during each revolution of the drum and only during a time interval less than a minor portion of one revolution of the drum, said control means including a template, a pair of opposed nozzles, one of said pair of nozzles receiving fluid under a constant pressure and projecting it as a stream of fluid into the other nozzle of the pair, said template being mounted for rotation and positioned to interrupt said fluid stream, and converting means operatively connected with said other nozzle and the said double acting cylinder whereby variations of fluid pressure in said other nozzle caused by the interruption of said stream by said template controls the actuation of said double acting cylinder.

2. A machine as claimed in claim 1 in which said converting means moves said cylinder only during a common angular movement of the drum less than 90° during each revolution thereof.

References Cited in the file of this patent

UNITED STATES PATENTS

| | | |
|---|---|---|
| 1,927,811 | Stevens | Sept. 19, 1933 |
| 1,964,445 | Wikle | June 26, 1934 |
| 2,016,865 | Lerch | Oct. 8, 1935 |
| 2,126,892 | Kenyon | Aug. 16, 1938 |
| 2,276,916 | Barrett | Mar. 17, 1942 |
| 2,341,644 | Moller | Feb. 15, 1944 |
| 2,343,181 | Heinz | Feb. 29, 1944 |
| 2,404,368 | Esch | July 23, 1946 |
| 2,814,487 | Medkeff | Nov. 26, 1957 |

FOREIGN PATENTS

| | | |
|---|---|---|
| 1,039,092 | France | May 13, 1953 |